… …
10/22/85                    OR           4,548,614

United States Patent [19]
Ireland

[11] Patent Number: 4,548,614
[45] Date of Patent: Oct. 22, 1985

[54] SOLVENT PRECIPITATION OF SALT

[75] Inventor: Donald T. Ireland, Minnetonka, Minn.

[73] Assignee: Cargill, Incorporated, Minneapolis, Minn.

[21] Appl. No.: 467,159

[22] Filed: Feb. 16, 1983

[51] Int. Cl.⁴ .......................... C01D 3/04; C01D 3/16
[52] U.S. Cl. ....................................... 23/300; 23/303; 159/DIG. 20
[58] Field of Search .................. 23/300, 303; 159/DIG. 20; 423/429, 179

[56] References Cited

U.S. PATENT DOCUMENTS

| | | | |
|---|---|---|---|
| 1,232,156 | 7/1917 | Wrinkle et al. | 423/429 X |
| 1,510,046 | 9/1924 | Dolbear | 23/300 X |
| 1,593,038 | 7/1926 | Silsbee | 23/300 |
| 3,212,863 | 10/1965 | Goodenough et al. | 23/302 R |
| 3,231,340 | 1/1966 | Gaska | 23/302 R |
| 3,279,897 | 10/1966 | Goodenough et al. | 23/300 X |
| 3,359,076 | 12/1967 | Gaska | 23/302 R |
| 3,384,459 | 5/1968 | Carter et al. | 23/303 X |
| 3,437,451 | 4/1969 | Every | 23/300 |
| 3,713,991 | 1/1973 | Thomas | 23/303 X |

Primary Examiner—Peter Hruskoci
Assistant Examiner—W. Gary Jones
Attorney, Agent, or Firm—Fitch, Even, Tabin & Flannery

[57] ABSTRACT

A low boiling, water soluble organic solvent is added to a saturated brine to thereby reduce the salt solubility of the brine and cause precipitation of the salt. The precipitated salt is filtered out and dried. The remaining brine-solvent mixture is distilled to remove the solvent which is reused. Unsaturated brine that is generally free of solvent is returned for resaturation with salt.

10 Claims, 3 Drawing Figures

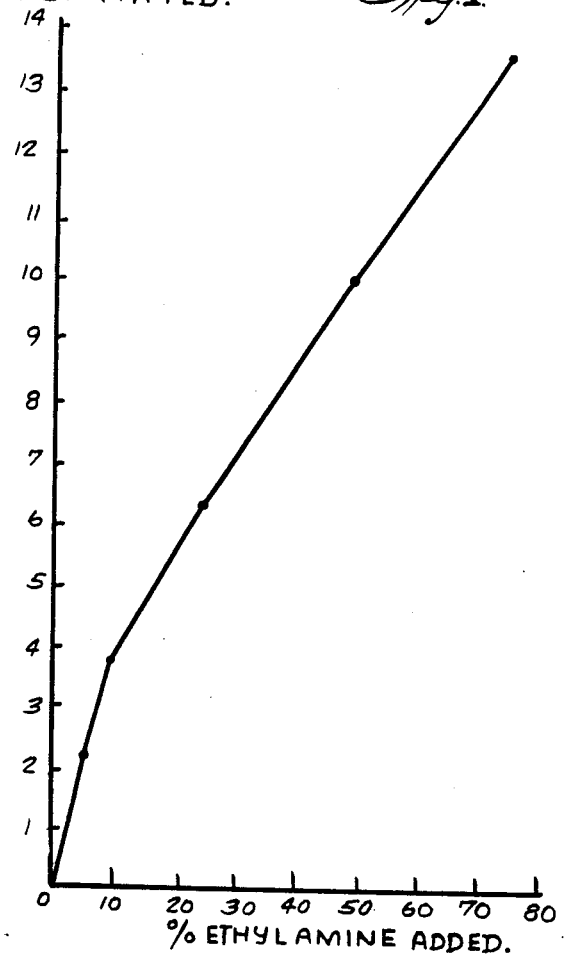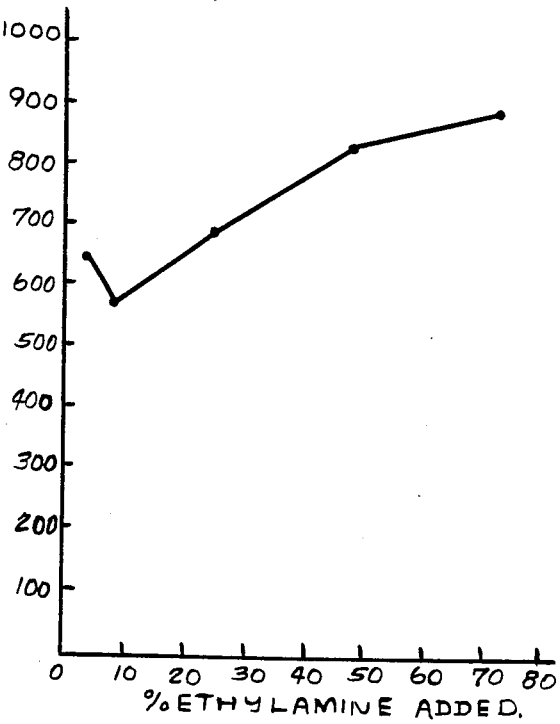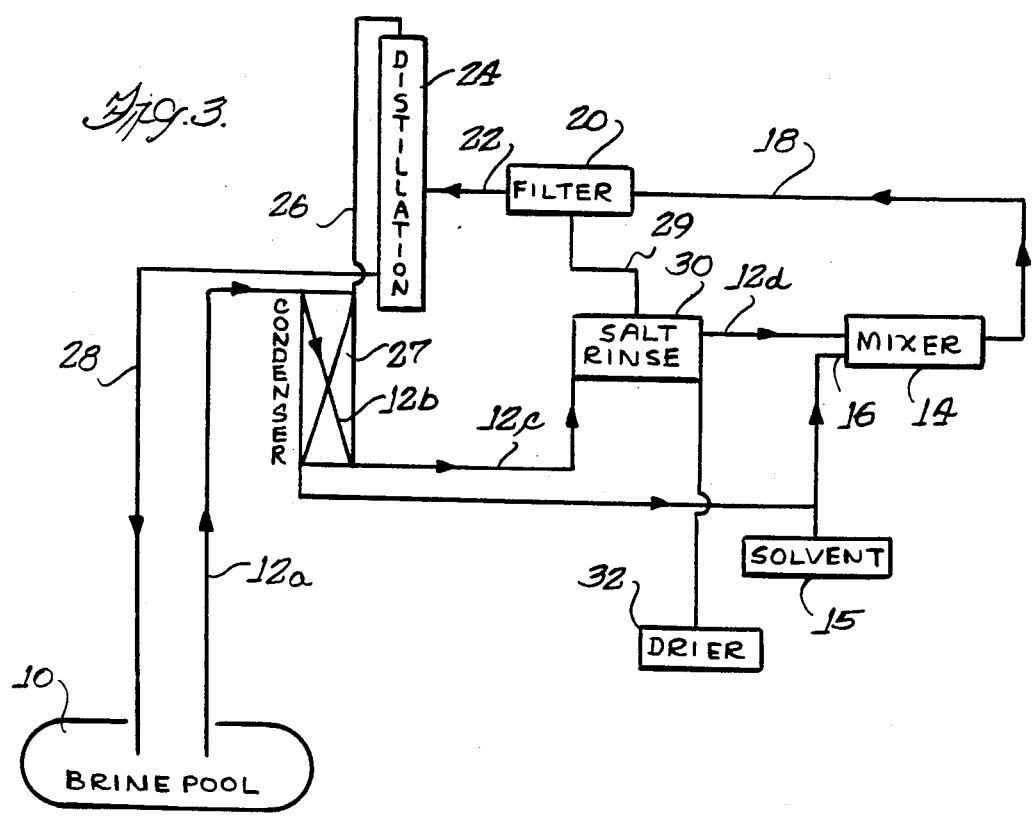

SOLVENT PRECIPITATION OF SALT

The present invention relates generally to the production of salt from brine and more particularly it relates to production of high purity salt without boiling.

BACKGROUND OF THE INVENTION

One commercial source of common salt (sodium chloride) is wells containing underground brine pools in which water is substantially saturated with salt. Salt is generally obtained from these brine pools by pumping the brine from underground and evaporating water to yield solid, dry salt. While lower grade salts may be obtained by natural evaporation of brine held in ponds, high purity salt is commonly obtained by a process in which the brine is boiled to remove the water. A substantial cost of producing salt is incurred when the brine is boiled off, since the brine has a specific heat of 0.78 cal/g°C. and water has a specific heat of vaporization of 540 cal/g. Using these figures, the energy expended in producing salt from saturated brine at 22° C. can be calculated as follows: The heat required to raise the temperature of 100 g of the brine from 22° C. to 108.7° C. (the boiling point of brine) is 100 g×0.78 cal/g°C.×(108.7−22)°C.=6762 cal. The heat required to vaporize the water is 73.6 g (the amount of water in 100 g of saturated brine)×540 cal/g.=39744 cal. The total heat used to evaporate the water is 46,506 cal. and 26.4 g of salt is obtained. Thus 1761.6 cal. (46,506/26.4) are expended in producing each gram of salt.

It is a primary object of the present invention to provide a method of obtaining high purity salt from brine that requires the input of substantially less energy than is required to boil water from brine.

SUMMARY OF THE INVENTION

A water soluble organic solvent is added to brine that reduces the solubility of salt in the brine and precipitates salt therefrom, and the precipitated salt is filtered and dried. The organic solvent is distilled from the unsaturated brine for reuse, and the unsaturated brine is pumped back into the brine well where it is resaturated. Through the use of solvents having low boiling points, low specific heat and low heats of vaporization, the total energy expenditure is substantially less than the energy required in producing salt by boiling water from brine.

BRIEF DESCRIPTION OF THE DRAWINGS

FIG. 1 is a graph representing the amount of salt precipitated from 100 g of saturated brine by the addition of various amounts of ethylamine;

FIG. 2 is a graph representing the theoretical energy expenditure using various amounts of ethylamine to precipitate salt from 100 g of brine; and FIG. 3 is a schematic diagram of a process of producing salt from brine by organic solvent precipitation in accordance with the practice of the invention.

DETAILED DESCRIPTION OF THE PREFERRED EMBODIMENTS

In accordance with the present invention, it is found that the use of particular water soluble organic solvents to precipitate salt from brine results in substantial energy savings over the common process of boiling away the water from a brine solution. The water soluble organic solvent is selected which substantially reduces salt solubility in water and, therefore, when added to brine, effects precipitation of significant amounts of salt leaving an unsaturated brine. Precipitated salt is removed by filtration and dried. The unsaturated brine containing the organic solvent is distilled to remove the solvent which is continually recycled through the system. The unsaturated brine is returned to a brine pool where it becomes saturated.

Although the process described herein involves relatively few processing steps, the process is more involved than simple boiling of water from brine, and the energy savings must be sufficient to justify the cost of additional apparatus and solvent to operate the system. The efficiency of the system from an energy standpoint is largely dependent on the solution of solvent. The efficiency of the solvent as a salt precipitator and the energy needed to separate solvent from the unsaturated brine thereafter are two of the major factors in the efficiency of the solvent.

It is desirable to use a solvent which precipitates as much salt with as little addition of solvent as possible because energy must be later expended in recovering the solvent from the unsaturated brine. For purposes of this invention, it is necessary that the solvent should precipitate from a substantially saturated brine solution at least about 0.15 g and preferably more than about 0.25 g of salt for each gram of organic solvent added.

For purposes of this invention it is required that the solvent be soluble in the brine, in order that a substantial portion of the salt be removed from the brine. It is most convenient to use solvents that are infinitely soluble or very soluble in water; however, if the solvent precipitates sufficient amounts of salt in approaching the limits of its solubility in brine, it may also be used. Generally it is considered necessary that the solvent be at least about 20% soluble in water. Preferably the heat of vaporization of the solvent is below about 200 cal/g and more preferably below about 150 cal/g. Preferably the specific heat of the solvent is less than about 0.7 cal/g°C. and more preferably below about 0.4 cal/g°C.

The energy required to separate the solvent from the brine after precipitation depends, in most cases, on the boiling point of the solvent which determines the number of degrees to which the brine-solvent mixture must be heated for distillation purposes, the specific heat of the solvent, which determines the number of calories which must be input into the brine-solvent mixture to raise the brine-solvent mixture each degree, and the heat of vaporization of the solvent, which determines the number of additional calories needed to vaporize the solvent. The smaller the specific heat of the solvent and the smaller the heat of vaporization of the solvent, the fewer calories required in distillation. Generally low boiling point solvents are preferred because the less difference between the temperature of the brine from the pool and the boiling temperature of the solvent, the fewer calories required for boiling the solvent away from the brine. Furthermore, with higher boiling point solvents, less complete distillation is generally effected, the distilled solvent commonly containing significant amounts of water, and this water, with its high heat of vaporization, represents an energy penalty. Hence, the solvent should have a boiling point below about 65° C., and preferably below about 45° C.

On the other hand, substantial handling difficulties are encountered with solvents with boiling points around or below the well temperature of the brine. The substantial vapor pressures of these solvents may require pressurizing and/or cooling the brine-solvent mixture. However, depending on the other considerations, such low boiling point solvents may be used advantageously, particularly, in view of the low energy requirements for distilling such low boiling solvents. Although the boiling point of the solvent may be as as low as −10° C., it is most preferable that the solvent selected have a boiling point betweeen about 5° C. and about 10° C. higher than the temperature of the brine from the pool, the most preferred solvents, therefore depending in part on the brine temperature from the pool.

A further consideration in the selection of a solvent is its separability from water. It is highly preferred that the solvent is completely separable from the brine by distillation, that is, it is highly desirable that the solvent not form an azeotrope with water. If an azeotrope is formed, small but significant amounts of the solvent will remain in the brine solution and be lost to the brine well, and the distilled solvent will contain significant amounts of water thereby reducing its efficiency as a salt precipitator. Again, the water that is vaporized with the solvent during distillation represents an energy penalty which is desirably minimized. However, if the particular solvent is especially advantageous in other respects, i.e., from an energy standpoint, it may form an azeotrope with water in which the solvent comprises up to about 2 percent by weight of the azeotrope and still be useful in the process.

A rough determination of the energy required to obtain a gram of salt may be calculated as follows: The energy required to raise (or lower) the given amount of solvent to the distillation temperature is the product of (1) the number of degrees difference between the distillation temperature and the temperature of the brine from the pool, (2) the specific heat of the solvent, and (3) the weight of solvent used. The energy required to raise the temperature of the brine to the distillation temperature is the product of (1) the temperature difference, (2) the specific heat of the brine, and (3) the weight of the brine. The energy of boiling the solvent is the product of (1) the amount of solvent and (2) the heat of vaporization. The sum of the above products is the total energy expended in the system. The energy required to obtain a gram of salt is obtained by dividing the total energy expended by the grams of salt recovered.

In the case of precipitating brine having a well temperature of 22° C., the energy calculations for a system using 75 g of ethylamine to precipitate salt from 100 g of saturated brine work out as follows:

| | |
|---|---|
| Energy required to lower temperature of ethylamine from 22° to 16° C. (75 g) (22°-16° C.) (0.5 cal/g °C.) = | 225 cal |
| Energy required to lower temperature of brine from about 22° C. to 16° C. (100 g) (22°-16° C.) (0.78 cal/g °C.) = | 468 cal |
| Energy required to boil ethylamine (75 g) (145.7 cal/g) = | 10928 cal |
| TOTAL ENERGY | 11621 cal |
| 13.6 grams of salt were precipitated; 11621 cal/13.6 g = | 854.5 cal/g |

This represents an energy expenditure to obtain a gram of salt less than half the energy expenditure in boiling to dryness a saturated brine solution. In order to be energy efficient, the solvent must, of course, yield salt with the input of less energy than the boiling method, and because additional energy requirements, such as brine and solvent pumping, are not included in the above calculations, the calculated energy requirements should generally not exceed about 1300 cal per gram of salt precipitated.

For each solvent and brine at each temperature, an energy curve for obtaining a gram of salt with varying solvent proportions can be calculated. For most solvents, within a range at the low end of solvent-to-brine ratios, the amount of salt precipitated is generally proportional to the amount of solvent added, and it is generally most efficient to add as much solvent as possible within this range because it must be appreciated that the brine must be heated to the distillation temperature, and it is undesirable to heat more brine than is necessary. Upwards of this range, there comes a point of diminishing returns where incremental increases of solvent effect an increase in salt precipitation at smaller incremental rates. Beyond this point, the energy penalty paid in the solvent heat of vaporization quickly becomes predominant. Accordingly, for most solvents for precipitating brine of a particular well temperature, the energy curve has a "V" shape, peaking at a lowermost point around the upper end of the range where salt precipitation is generally proportional to the amount of solvent added. The cycle is most efficient when operated using solvent-to-brine ratios generally corresponding to the lowermost point of this V-shaped curve. This analysis will be modified somewhat by other energy considerations not taken into account by the above calculations. If the energy expended in pumping brine is considered, energy advantages accrue by extracting large amounts of salt from the brine as it passes through the apparatus. Thus in practice, the optimal percentage of solvent may well be somewhat above that calculated.

Illustrated in FIG. 1 is a graph showing on the abcissa the number of grams of ethylamine added to a 100 g of saturated 22° C. brine solution, and on the ordinate, the total grams of salt precipitated from the brine. It can be seen that up to about 10 g of ethylamine for 100 g of brine, the amount of salt precipitated is substantially linear. Above this range, the incremental increase in salt precipitation decreases.

Illustrated in FIG. 2 is a graph showing the calories required to obtain a gram of salt from the saturated brine solution using various proportions of ethylamine per weight of brine. It can be seen that the energy requirements are minimized when about 10 g of ethylamine are used to precipitate salt from 100 g of saturated brine.

The energy minimization point must be determined separately for each solvent for brines of different well temperatures. For a solvent with limited brine solubility, the curve is truncated at the saturation level of the solvent, in which case the energy curve is typically at a minimum at the saturation point.

EXAMPLE 100 g of brine saturated at 22° C. is mixed with 75 g of ethylamine in a beaker by means of a stirring bar. The beaker is disposed in a 22° C. bath. Stirring is continued for 5 minutes, and thereafter, the mixture is filtered to recover the precipitated salt. The precipitated salt is washed on the filter with 25 ml of additional saturated brine at 22° C. The salt is dried and determined to weigh 13.7 g. The total amount of salt in the brine is 26.4 g as determined by boiling the water away from 100 g of saturated brine. Thus, about 52 percent of the salt is recovered by precipitation.

A salt purity determination was made by converting the calcium plus magnesium contents, as determined by E.D.T.A. titration, into calcium sulphate and subtracting from 100. The purity of the salt calculated by this method was found to be 99.7%.

This example demonstrates that sodium chloride of substantial purity may be obtained from saturated brine by solvent precipitation.

In addition to the energy, solubility and azeotropic considerations cited above, the solvent should be relatively inexpensive because although the solvent is continuously recycled, even in the most efficient cycle, solvent will be continuously lost.

Suitable solvents along with their boiling points, heat of vaporization and specific heats, along with information relating to azeotrope formation with water are listed in the Table below. These values were obtained from various standard references including the *Handbook of Chemistry and Physics*, *Organic Solvents* by Riddick and Bunger, and the *Handbook of Solvents* by Scheflan and Jacobs and from a book entitled *Azeotropic Data* from the *Advances in Chemistry* series. Not all data is available for all of the compounds; however, in each case, it is believed that the missing data, which is easily obtainable by conventional experimental methods, would show that these solvents are energy efficient for particular salt precipitation applications. It is to be understood that useful solvents are not limited to those listed in the table below.

TABLE

| Solvent | $H_2O$ Solubility | Heat of Vaporization cal/g | Specific Heat cal/g-°C. | Boiling Point °C. | Azeotrope % by wt. |
|---|---|---|---|---|---|
| Methylamine | 1153.9 ml at 12.5° C. | 198.1 | .385 | −6.5 | — |
| Dimethylamine | Very soluble | 140.4 | .366 | 7.4 | — |
| Trimethylamine | Very soluble | 92.7 | .371 | 3.5 | — |
| Ethylamine | Completely | 145.7 | .5 | 16. | no |
| Acetaldehyde | Completely | 147.5 | .336 | 20.4 | no |
| Methylformate | 23% | 112.4 | .478 | 31.5 | no |
| Isopropylamine | Completely | 109.9 | .668 | 32.4 | — |
| Propylene Oxide | 40.5% | 118.3 | .495 | 33.9 | no |
| Dimethyoxymethane | 24.4% | 90.7 | .507 | 42.3 | 1.4 |
| T-butylamine | Completely | 92.8 | .628 | 44.4 | no |
| Propionaldehyde | 30.6% | — | .522 | 48.0 | 2.0 |
| N—propylamine | Completely | 120.2 | .656 | 48.5 | no |
| Allylamine | Completely | — | — | 52.3 | no |
| Diethylamine | 44.9 | 97.5 | .577 | 55.0 | no |
| Acetone | Completely | 119.7 | .249 | 56.3 | no |
| S—butylamine | Completely | 104.9 | — | 62.5 | no |

Referring now to FIG. 3, in which a continuous salt recovery process is outlined, saturated brine is pumped from a brine pool 10 through lines 12a,b,c,d to a mixer 14 where a solvent is introduced through line 16 and mixed with the brine as it flows through the mixer. The saturated brine may serve to cool the distillate, as hereinafter described, which comprises the solvent. Solvent line 16 is also supplied from a make-up tank 15. The mixture, along with the precipitated salt, are pumped through line 18 into a filter unit 20 where the salt is recovered from the solvent-unsaturated brine mixture. The filtered solvent-unsaturated brine mixture or filtrate is then passed through line 22 to a distillation unit 24 where the solvent is recovered as a distillate. The solvent vapors are passed through line 26 to a condenser 27, which in a preferred embodiment is cooled by saturated brine flowing through line 12b from the brine pool 10. The unsaturated brine or distillate is pumped through line 28 back into the brine pool 10 where it again becomes saturated.

The salt recovered in the filter unit 20 is transferred by line 29 to a salt rinse unit 30 where it is contacted with incoming saturated brine from line 12c, this process helping to remove any trapped organic solvent from the salt crystals. Salt is transferred from the rinse unit 30 to a drier 32 completing the salt recovery process.

While the process has been described in terms of a preferred embodiment, modifications obvious to one with ordinary skill in the art may be made without departing from the scope of the invention. While certain preferred solvents have been described, other solvents known to those with ordinary skill in the art may also be used.

Various features of the invention are set forth in the following claims.

What is claimed:

1. A process for extracting sodium chloride from a saturated brine solution comprising selecting an organic solvent having a boiling point between about −10° C. and about 65° C., having a specific heat below about 0.7 cal/g°C., having a heat of vaporization below about 200 cal/g, being at least about 20 percent by weight soluble in water, either forming no azeotrope with water or forming an azeotrope with water containing less than about 2 percent by weight of said solvent, and precipitating at least about 0.15 gm of sodium chloride for each gm of solvent added, mixing said brine solution with said organic solvent, said organic solvent being added to said brine in an amount and at a temperature to precipitate sodium chloride at a total energy expenditure for the process, as herein described, of 1300 cal/gm of sodium chloride or less, the addition of said solvent precipitating sodium chloride crystals forming a mixture of solvent and unsaturated brine, filtering the sodium chloride from the mixture of solvent and unsaturated brine, distilling the unsaturated brine-solvent mixture to recover the solvent, and reusing the solvent in the process.

2. A process according to claim 1 including returning the unsaturated brine remaining after said distillation to a brine source for resaturation.

3. A process according to claim 1 including rinsing said sodium chloride with saturated brine from the brine source to remove residual solvent therefrom.

4. A process according to claim 1, wherein said brine is from a source and said solvent has a boiling point between about 5 and about 10° C. higher than said source of the brine.

5. A process according to claim 1 wherein said solvent is selected from the group consisting of methylamine, demethylamine, trimethylamine, ethylamine, acetaldehyde, methylformate, isopropylamine, propylene oxide, dimethyoxymethane, t-butylamine, propionaldehyde, n-propylamine, allylamine, diethylamine, acetone, and s-butylamine.

6. A process according to claim 5 wherein said temperature is below the boiling temperature of said brine.

7. A process according to claim 1 wherein said selected solvent precipitates at least about 0.25 gm of sodium chloride per each gm of solvent added to the brine.

8. A process according to claim 1 wherein said solvent has a heat of vaporization below about 150 cal/g.

9. A process according to claim 1 wherein said solvent has a specific heat below about 0.4 cal/g°C.

10. A process according to claim 1 wherein said temperature is below the boiling temperature of said brine.

* * * * *